S. J. RENO.
SUCKER-ROD COUPLING.
No. 188,187. Patented March 6, 1877.
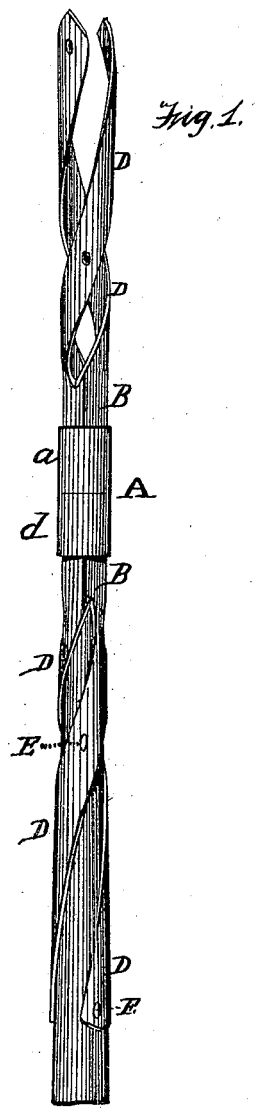
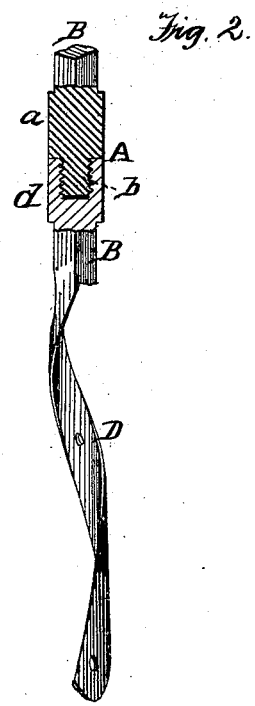

UNITED STATES PATENT OFFICE.

SAMUEL J. RENO, OF ALLEGHENY, PENNSYLVANIA.

IMPROVEMENT IN SUCKER-ROD COUPLINGS.

Specification forming part of Letters Patent No. 188,187, dated March 6, 1877; application filed February 13, 1877.

*To all whom it may concern:*

Be it known that I, SAMUEL J. RENO, of Allegheny, in the county of Allegheny and State of Pennsylvania, have invented a new and useful Improvement in Attachments for Couplings of Sucker-Rods for Pumps, of which the following is a specification, reference being had to the accompanying drawings.

The device relates to an improved attachment for couplings of sucker-rods for pumps, and is especially designed to be applied for the purpose of connecting sections of such rods as used in oil-wells.

The object of the invention is to provide a coupling attachment having a tang or socket formed of flat spirally-twisted pieces of metal, to receive the end of the rod, which can be secured therein by rivets, transfixing the tang or tangs and rod at different angles, thus insuring a certain connection, and avoiding the danger of splitting or otherwise impairing the strength of the rod.

Figure 1 is a view *in extenso*, showing the device in question, the upper part showing the socket empty, the lower part the sucker-rod in the socket. Fig. 2 is a vertical central longitudinal section of the coupling, with one tang attached.

A in the accompanying drawing represents a coupling composed of the cylinder $a$, provided with the threaded socket-pin $b$, serving to engage the internal screw-thread aperture within the cylinder $d$, which, when united with the other cylinder $a$, forms the coupling A, the transverse diameter of which is equal throughout, and its sides flush.

Upon each cylinder, and preferably forming one part thereof, is provided the shoulder B, from which extend the tangs D.

It is obvious that the cylinder, tangs, and shoulder may all be formed in one piece, which is the preferred construction; or the head may be omitted, and the tangs formed at or from the end of the cylinder direct, or a single tang may be used.

The tangs D are in the present instance extensions of the head B, their bases being on opposite sides of the shoulder, whence they are twisted spirally opposite each other, the distance between them gradually increasing as they extend away from the shoulder B.

There is thus formed a conical tapered skeleton socket or cage, the component parts of which are spiral, and overlap each other on opposite sides. These tangs are also rendered slightly concavo-convex, so as to fit accurately upon the end of the sucker-rod inserted in the socket, and which may be secured therein by rivets E passing through the tangs and rods from opposite sides, and placed at different angles to the longitudinal axis of the rod. Thus each rivet binds the wood of the rod and prevents splitting.

From the above it is obvious that a socket of great strength and lightness is formed, and that the peculiar structure of the socket affords a means of placing the rivets so as to secure a firm construction, and avoid all danger of splitting the rod. It is also obvious that the tangs above the shoulder B may be pressed into the wood of the sucker-rod F, so as to be flush therewith, and thus the objection of wearing the casing by the movement of the sucker-rod is obviated.

The diameter of the rods being greater than the socket, and the ends of the tangs adjacent the shoulder being compressed until the distance between them is less than the diameter of the coupling A, the other parts of the tangs being pressed into the wood of the rod, it is plain that no part of the coupling will come in contact with the casing.

It is plain that either the socket or a single tang can be used effectually to connect either of the parts of the coupling to the rod.

What I claim as my invention, and desire to secure by Letters Patent, is—

1. A sucker-rod coupling having a socket provided with one or more spirally-twisted overlapping tangs, substantially as set forth.

2. A spirally-twisted tang to secure a sucker-rod to either part of a coupling, substantially as set forth.

3. The socket composed of the tangs D, in combination with the cylinder $a$ or $d$, substantially as expressed.

In testimony that I claim the foregoing improvement in attachments for couplings of sucker-rods for pumps, as above described, I have hereunto set my hand this 13th day of February, 1877.

SAM. J. RENO.

Witnesses:
J. H. HERRON,
JOHN T. BURCH.